US011967479B2

(12) United States Patent
Zhang

(10) Patent No.: US 11,967,479 B2
(45) Date of Patent: Apr. 23, 2024

(54) FIELD EMISSION CATHODE DEVICE AND METHOD OF FORMING A FIELD EMISSION CATHODE DEVICE

(71) Applicant: NCX Corporation, Raleigh, NC (US)

(72) Inventor: Jian Zhang, Durham, NC (US)

(73) Assignee: NCX Corporation, Raleigh, NC (US)

( * ) Notice: Subject to any disclaimer, the term of this patent is extended or adjusted under 35 U.S.C. 154(b) by 0 days.

(21) Appl. No.: 18/247,260

(22) PCT Filed: Sep. 29, 2021

(86) PCT No.: PCT/IB2021/058936
§ 371 (c)(1),
(2) Date: Mar. 29, 2023

(87) PCT Pub. No.: WO2022/070093
PCT Pub. Date: Apr. 7, 2022

(65) Prior Publication Data

US 2024/0079196 A1 Mar. 7, 2024

Related U.S. Application Data

(60) Provisional application No. 63/085,417, filed on Sep. 30, 2020.

(51) Int. Cl.
*H01J 1/304* (2006.01)
*H01J 9/02* (2006.01)

(52) U.S. Cl.
CPC .............. *H01J 1/304* (2013.01); *H01J 9/025* (2013.01)

(58) Field of Classification Search
CPC .................................. H01J 1/304; H01J 9/025
USPC .......................................................... 313/336
See application file for complete search history.

(56) References Cited

U.S. PATENT DOCUMENTS

| | | | | |
|---|---|---|---|---|
| 7,439,666 | B1 | 10/2008 | Liu et al. | |
| 2014/0070696 | A1* | 3/2014 | Cheatham, III | H01J 29/02 315/14 |
| 2022/0399177 | A1* | 12/2022 | Lee | H01J 35/065 |

FOREIGN PATENT DOCUMENTS

| | | |
|---|---|---|
| EP | 1 321 958 | 6/2003 |
| KR | 20100123253 | 11/2010 |
| KR | 101916711 | 1/2019 |

* cited by examiner

*Primary Examiner* — Christopher M Raabe
(74) *Attorney, Agent, or Firm* — Womble Bond Dickinson (US) LLP

(57) ABSTRACT

A field emission cathode device and method for forming a field emission cathode device involve a cathode element having a field emission surface disposed in spaced-apart relation to a gate electrode element so as to define a gap between the field emission surface and the gate electrode element. The gate electrode element extends laterally between opposing anchored ends. The gate electrode element is arranged to deform away from the field emission surface in response to heat, so as to increase the gap between the field emission surface and the gate electrode element.

16 Claims, 3 Drawing Sheets

FIELD EMISSION CATHODE DEVICE AND METHOD OF FORMING A FIELD EMISSION CATHODE DEVICE

CROSS-REFERENCE TO RELATED APPLICATIONS

This application is a national stage filing under 35 U.S.C. 371 of PCT/IB2021/058936, filed Sep. 29, 2021, which International Application was published by the International Bureau in English on Apr. 7, 2022, as WO 2022/070093, and application claims priority from U.S. Application No. 63/085,417, filed on Sep. 30, 2020, which applications are hereby incorporated in their entirety by reference in this application.

BACKGROUND

Field of the Disclosure

The present application relates to field emission cathode devices and, more particularly, to a field emission cathode device and method for forming a field emission cathode device.

Description of Related Art

Figure 1:
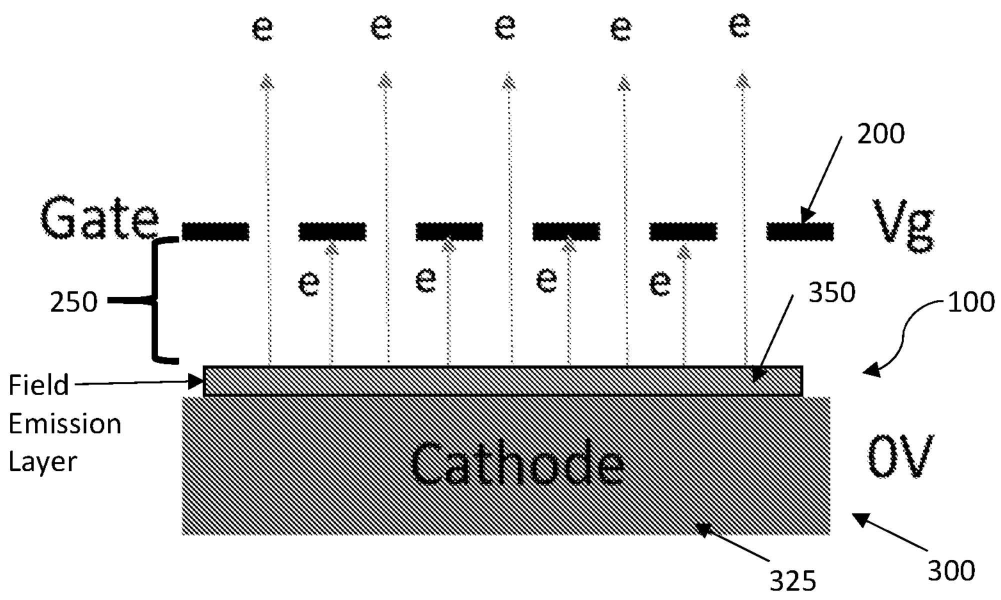

A field emission cathode device/assembly generally includes a field emission cathode disposed in relation to an extraction gate structure (e.g., a gate electrode) so as to define a gap therebetween (see, e.g., the prior art shown in FIG. 1). An external gate voltage (V g) is applied to the gate electrode, with the cathode being connected to ground, such that the generated electric field extracts field emission electrons from the cathode surface. Once the electrons are emitted from the cathode surface, some of the electrons will pass through the opening(s) of the gate electrode, while other electrons are absorbed by the gate electrode (e.g., some emitted electrons will bombard the gate electrode).

The gate electrode in the prior art can have different forms. In some instances, the gate electrode is configured to include multiple linear bars in a grill-like structure (see, e.g., FIG. 2A). In other instances, the gate electrode is configured as a mesh-like structure (see., e.g., FIG. 2B). Moreover, the gate electrode is generally comprised of a conductive material with a high melting temperature, such as, for example, tungsten, molybdenum, stainless steel, or doped silicon.

During the electron field emission process, the emitted electrons, particularly those not passing through the gate electrode, will bombard the gate electrode, thereby resulting in heating of the gate electrode. The heating of the gate electrode may cause structural deformation of the structure. If this heat-induced structural deformation reaches a certain threshold, permanent damage of the gate electrode can result, and this is often the root cause of failure of the gate electrode.

Figure 3A:
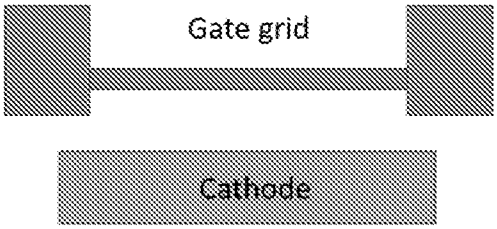
FIG. 3A Prior Art

For example, FIG. 3A schematically illustrates an original configuration of a gate electrode having a constant thickness cross-section (e.g., the structure is essentially planar with both opposing surfaces being parallel to each other. Upon being heated by electron bombardment, the structure will tend to deform/buckle due to lateral thermal expansion. Because of, for instance, physical constraints in the mounting of the gate electrode, the heat-induced deformation may occur in different manners. If the structure buckles toward the cathode (see, e.g., FIG. 3B), the distance (e.g., the gap) between the gate electrode and the cathode is narrowed or decreased. Since the field emission current generated by the electric field between the gate electrode and the cathode is dependent upon the dimension of the gap, a larger emission current will likely be induced due to the decreased gap. The larger emission current, in turn, will cause additional heating of the gate electrode and therefore increased deformation. This cycle generally causes permanent damage to the gate electrode structure.

Thus, there exists a need for a field emission cathode device, and a method of forming such a field emission cathode device, implementing a gate electrode, wherein heat-induced deformation from electron bombardment does not result in narrowing or decreasing of the gap between the gate electrode and the cathode, and wherein such improvements would minimize or eliminate heat-induced failure of the field emission cathode device.

SUMMARY OF THE DISCLOSURE

The above and other needs are met by aspects of the present disclosure which includes, without limitation, the following example embodiments and, in one particular aspect, provides a field emission cathode device, wherein such a device comprises a cathode element having a field emission surface; and a gate electrode element disposed in spaced-apart relation to the field emission surface of the cathode element so as to define a gap therebetween, the gate electrode element laterally-extending between opposing anchored ends, the gate electrode element being arranged to deform away from the field emission surface in response to heat, so as to increase the gap between the field emission surface and the gate electrode element.

Another example aspect provides a method of forming a field emission cathode device, wherein such a method comprises arranging a gate electrode element in spaced-apart relation to the field emission surface of the cathode element so as to define a gap therebetween; and anchoring opposing ends of the gate electrode element such that the gate electrode element extends laterally therebetween, and such that the gate electrode element is arranged to deform away from the field emission surface in response to heat, so as to increase the gap between the field emission surface and the gate electrode element.

The present disclosure thus includes, without limitation, the following example embodiments:

Example Embodiment 1: A field emission cathode device, comprising a cathode element having a field emission surface; and a gate electrode element disposed in spaced-apart relation to the field emission surface of the cathode element so as to define a gap therebetween, the gate electrode element laterally-extending between opposing anchored ends, the gate electrode element being arranged to deform away from the field emission surface in response to heat, so as to increase the gap between the field emission surface and the gate electrode element.

Example Embodiment 2: The device of any preceding example embodiment, or combinations thereof, wherein the gate electrode element defines opposed first and second laterally-extending surfaces, with the first laterally-extending surface being disposed to face the field emission surface of the cathode element, and wherein the first laterally-extending surface between the opposing ends is planar or concave.

Example Embodiment 3: The device of any preceding example embodiment, or combinations thereof, wherein the second laterally-extending surface is opposed to the first laterally-extending surface so as to face away from the field emission surface, and wherein the second laterally-extending surface between the opposing ends is convex or includes a series of convex protrusions.

Example Embodiment 4: The device of any preceding example embodiment, or combinations thereof, wherein the gate electrode element defines a thickness between the opposed first and second laterally-extending surfaces, the thickness being greater about a medial portion thereof than toward the opposed ends.

Example Embodiment 5: The device of any preceding example embodiment, or combinations thereof, wherein the gate electrode element is arranged to expand laterally in response to heat generated by bombardment of electrons emitted from the field emission surface in response to an electric field between the gate electrode element and the field emission surface of the cathode element.

Example Embodiment 6: The device of any preceding example embodiment, or combinations thereof, wherein the gate electrode element is arranged such that deformation thereof in response to the lateral expansion increases the gap between the gate electrode element and the field emission surface of the cathode element, and decreases the bombardment of electrons on the gate electrode element, the decreased electron bombardment reducing the generated heat, and causing the gate electrode element to laterally contract to reverse the deformation thereof.

Example Embodiment 7: The device of any preceding example embodiment, or combinations thereof, wherein gate electrode element is comprised of a conductive material having a high melting temperature.

Example Embodiment 8: The device of any preceding example embodiment, or combinations thereof, wherein the gate electrode element is comprised of tungsten, molybdenum, stainless steel, doped silicon, or combinations thereof.

Example Embodiment 9: A method of forming a field emission cathode device, comprising arranging a gate electrode element in spaced-apart relation to the field emission surface of the cathode element so as to define a gap therebetween; and anchoring opposing ends of the gate electrode element such that the gate electrode element extends laterally therebetween, and such that the gate electrode element is arranged to deform away from the field emission surface in response to heat, so as to increase the gap between the field emission surface and the gate electrode element.

Example Embodiment 10: The method of any preceding example embodiment, or combinations thereof, wherein the gate electrode element defines opposed first and second laterally-extending surfaces, with the first laterally-extending surface being disposed to face the field emission surface of the cathode element, and wherein the method comprises forming the gate electrode element such that the first laterally-extending surface between the opposing ends is planar or concave.

Example Embodiment 11: The method of any preceding example embodiment, or combinations thereof, wherein the second laterally-extending surface is opposed to the first laterally-extending surface so as to face away from the field emission surface, and wherein the method comprises forming the gate electrode element such that the second laterally-extending surface between the opposing ends is convex or includes a series of convex protrusions.

Example Embodiment 12: The method of any preceding example embodiment, or combinations thereof, wherein the gate electrode element defines a thickness between the opposed first and second laterally-extending surfaces, and wherein the method comprises forming the gate electrode element such that the thickness is greater about a medial portion thereof than toward the opposed ends.

Example Embodiment 13: The method of any preceding example embodiment, or combinations thereof, wherein the gate electrode element is arranged to expand laterally in response to heat, and wherein anchoring the opposed ends comprises anchoring the opposed ends of the gate electrode element such that the gate electrode element is heated by bombardment of electrons emitted from the field emission surface in response to an electric field between the gate electrode element and the field emission surface of the cathode element.

Example Embodiment 14: The method of any preceding example embodiment, or combinations thereof, wherein anchoring the opposed ends comprises anchoring the opposed ends of the gate electrode element such that deformation thereof in response to the lateral expansion increases the gap between the gate electrode element and the field emission surface of the cathode element, and decreases the bombardment of electrons on the gate electrode element, the decreased electron bombardment reducing the generated heat, and causing the gate electrode element to laterally contract to reverse the deformation thereof.

Example Embodiment 15: The method of any preceding example embodiment, or combinations thereof, comprising forming the gate electrode element from a conductive material having a high melting temperature.

Example Embodiment 16: The method of any preceding example embodiment, or combinations thereof, comprising forming the gate electrode element from tungsten, molybdenum, stainless steel, doped silicon, or combinations thereof.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2A:
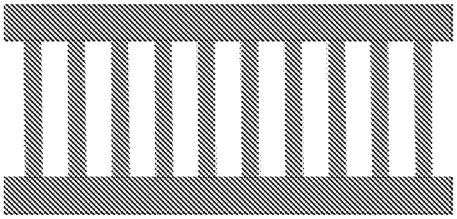
FIG. 2A Prior Art
Figure 2B:
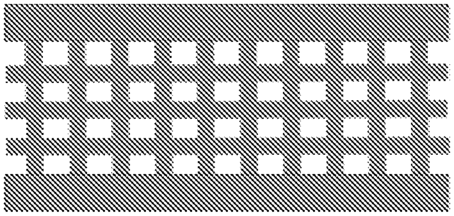
FIG. 2B Prior Art
Figure 3B:
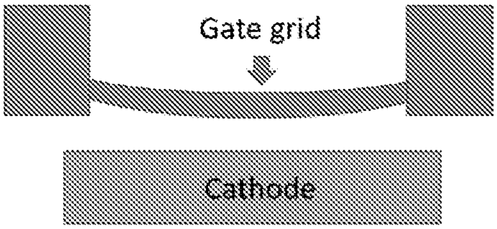
FIG. 3B Prior Art
Figure 4A:
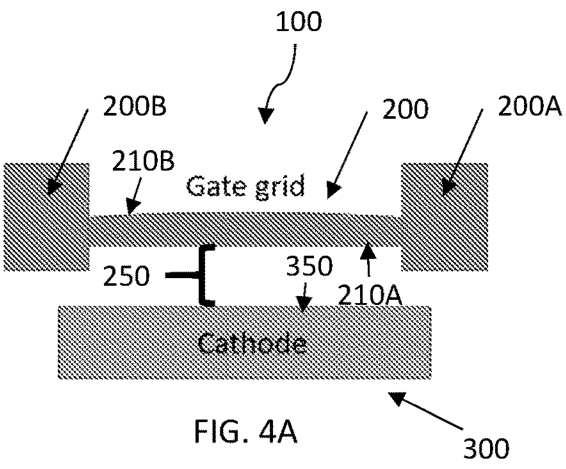
Figure 4B:
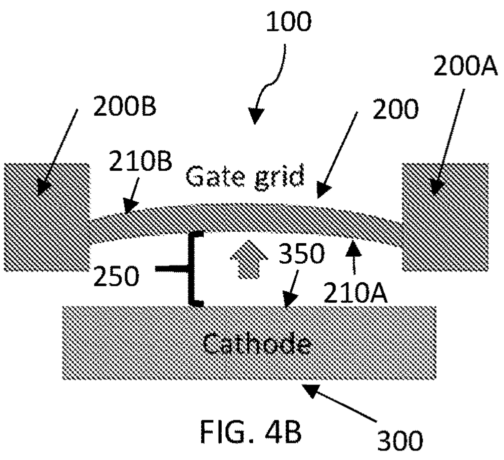
Figure 5:
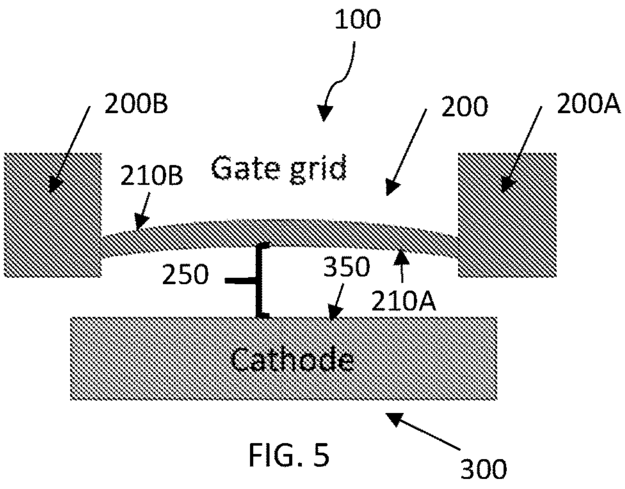
Figure 6:
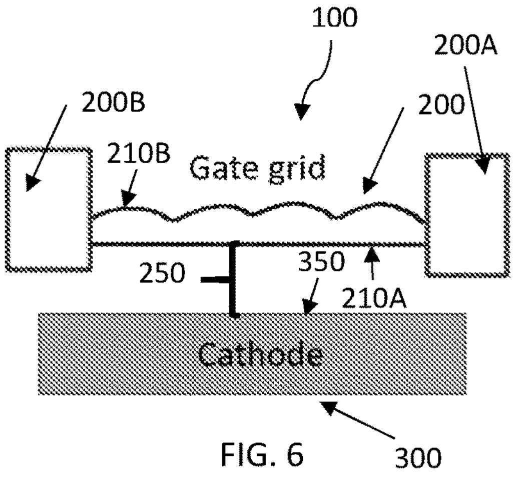

Having thus described the disclosure in general terms, reference will now be made to the accompanying drawings, which are not necessarily drawn to scale, and wherein:

FIG. 1 schematically illustrates a prior art example of a field emission cathode device;

FIG. 2A schematically illustrates a prior art example of a gate electrode for a field emission cathode device, with the gate electrode having multiple linear bars in a grill-like structure;

FIG. 2B schematically illustrates a prior art example of a gate electrode for a field emission cathode device, with the gate electrode having a mesh-like structure;

FIGS. 3A and 3B schematically illustrate a prior art example of a constant thickness (cross-section) gate electrode for a field emission cathode device, with the constant thickness gate electrode experiencing buckling toward, or sagging or saddling with respect to, the cathode of the field emission cathode device;

FIGS. 4A and 4B schematically illustrates a gate electrode for a field emission cathode device, according to one aspect of the present disclosure;

FIG. 5 schematically illustrates a gate electrode for a field emission cathode device, according to an alternate aspect of the present disclosure; and FIG. 6 schematically illustrates a gate electrode for a field emission cathode device, according to another alternate aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 4A, 4B, 5, and 6 illustrate various aspects of a gate electrode 200 for a field emission cathode device 100 (see, e.g., FIG. 1). Such a field emission cathode device 100 generally includes a cathode 300 comprising a substrate 325 (see, e.g., FIG. 1, and usually comprised of a metal or other conducting material such as stainless steel, tungsten, molybdenum, doped silicon), a layer of a field emission material 350 (e.g., a mixture of nanomaterials such as nanotubes, graphene, nanowires, etc. such as shown, for example in FIG. 1) disposed on the substrate 325, and, if necessary, an additional layer of an adhesion material (not shown) disposed between the substrate 325 and the field emission material 350.

A field emission cathode device/assembly 100 generally includes a field emission cathode 300 disposed in a spaced-apart relation to such a gate electrode 200 so as to define a gap 250 therebetween (see, e.g., FIG. 1). An external gate voltage (V g) is applied to the gate electrode 200, with the cathode 300 being connected to ground, such that the generated electric field extracts field emission electrons 400 from the field emission material 375 on the cathode surface (e.g., the substrate 325). Once the electrons 400 are emitted from the field emission material 325 on the cathode surface, some of the electrons 400 will pass through the opening(s) of the gate electrode 200, while other electrons 400 are absorbed by the gate electrode 200 (e.g., some emitted electrons will bombard the gate electrode).

The gate electrode 200, in some instances, is configured to include multiple linear bars in a grill-like structure (see, e.g., the plan view in FIG. 2A). In other instances, the gate electrode 200 is configured as a mesh-like structure (see., e.g., the plan view in FIG. 2B). Moreover, the gate electrode 200 is generally comprised of a conductive material with a high melting temperature, such as, for example, tungsten, molybdenum, stainless steel, or doped silicon.

During the electron field emission process, the emitted electrons, particularly those not passing through the gate electrode, will bombard the gate electrode, thereby resulting in heating of the gate electrode. The heating of the gate electrode, in some prior art instances, may cause structural deformation of the structure (e.g., sagging or saddling of the gate electrode due to thermal stress/expansion and/or gravity) such that the gap between the gate electrode and the field emission material on the cathode surface is reduced. The reduction of the gap between the gate electrode and the field emission material increases the electron bombardment of the gate electrode (e.g., increases the field current), which causes increased heating of the gate electrode. The increased heating of the gate electrode, leading to increased heat-induced structural deformation gate electrode, can cause permanent damage to and/or failure of the gate electrode.

Aspects of the present disclosure thus provide a field emission cathode device 100, comprising a cathode element 300 having a field emission surface (e.g., the field emission material 350), wherein a gate electrode element 200 is disposed in spaced-apart relation to the field emission surface 350 of the cathode element 300 so as to define a gap 250 therebetween. The gate electrode element 200 generally extends laterally between opposing anchored ends 200A, 200B (e.g., from a side view or a cross-sectional view of the field emission cathode device 100 as shown in FIGS. 4A, 4B, 5, and 6). In particular aspects, the gate electrode element 200 is arranged/configured to deform away from the field emission surface 350 of the cathode element 300 in response to heat (e.g., a generated by the field current/ion bombardment during operation), so as to increase the gap 250 between the field emission surface 350 and the gate electrode element 200.

That is, for example, the structure(s) of aspects of a gate electrode element 200 as disclosed herein address the identified deficiencies of prior art gate electrode. For example, in some aspects, the gate electrode element 200 defines opposed first and second laterally-extending surfaces 210A, 210B, with the first laterally-extending surface 210A being disposed to face the field emission surface 350 of the cathode element 300, and wherein the first laterally-extending surface 210A between the opposing ends 200A, 200B is planar or concave. In such aspects, the second laterally-extending surface 210B is opposed to the first laterally-extending surface 210A so as to face away from the field emission surface 350, and wherein the second laterally-extending surface 210B between the opposing ends 200A, 200B is convex or includes a series of convex protrusions.

More particularly, as shown for example in FIGS. 4A and 4B, one aspect of a gate electrode 200 according to the present disclosure has a planar first laterally-extending surface 210A, while the second laterally-extending surface 210B is convex. Upon heating of the gate electrode element 200, the gate electrode element 200, as shown in FIG. 4B will tend to deform away from the field emission material 350 on the cathode surface in response to thermal stress/expansion. That is, for example, due to pre-stressing from anchoring the opposing ends 200A, 200B or from the increased thickness toward the medial portion (e.g., the gate electrode element 200 defines a thickness between the opposed first and second laterally-extending surfaces 210A, 210B, with the thickness being greater about a medial portion thereof than toward the opposed ends 200A, 200B)

of the gate electrode element 200, the thermal expansion of the gate electrode element 200 due to heat during operation will cause deformation of the gate electrode element 200 in the direction of least physical resistance, which will be in a direction away from the cathode surface 350.

In other aspects, for example, the gate electrode element 200 can have a first laterally-extending surface 210A that is concave in relation to the cathode surface 350, while the second laterally-extending surface 210B is convex, as shown in FIG. 5. In yet other aspects, for example, the gate electrode element 200 can have a first laterally-extending surface 210A that is planar, while the second laterally-extending surface 210B defines a series of convex protrusions (e.g., in relation to a side view or cross-sectional view of the gate electrode element 200), as shown in FIG. 6. In such instances as illustrated in FIGS. 5 and 6, the thermal expansion of the gate electrode element 200 due to heat during operation will cause deformation of the gate electrode element 200 in the direction of least physical resistance, which will be in a direction away from the cathode surface 350.

Heat-induced deformation of the gate electrode element away from the cathode surface, particularly in light of the arrangements/configurations of a gate electrode element as disclosed herein, will increase the gap between the gate electrode element and the cathode surface. The increased gap, in turn, reduces the intensity of electric field-induced emission current (e.g., emission of electrons from the field emission material of the cathode surface), which will decrease or alleviate the heating of the gate electrode element. Decreased heating will thus cause reversal of the expansion/deformation of the gate electrode element, causing the gate electrode element to return toward the normal unexpanded configuration. Accordingly, aspects of a gate electrode according to the present disclosure thus provide a self-regulating or self-attenuation feedback mechanism for avoiding overheating and/or permanent deformation of the gate electrode element.

That is, aspects of the present disclosure provide a gate electrode element arranged to expand laterally in response to heat generated by bombardment of electrons emitted from the field emission surface in response to an electric field between the gate electrode element and the field emission surface of the cathode element. The resulting deformation of the gate electrode element in response to the lateral expansion increases the gap between the gate electrode element and the field emission surface of the cathode element, and decreases the bombardment of electrons on the gate electrode element. The decreased electron bombardment of the electrons on the gate electrode element thus reduces the generated heat, and causes the gate electrode element to laterally contract and thereby reverse the deformation thereof. The deformation and reversal of that deformation will thus self-regulate upon the field emission cathode device attaining steady-state operation.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A field emission cathode device, comprising:

a cathode element having a field emission surface; and a gate electrode element disposed in spaced-apart relation to the field emission surface of the cathode element so as to define a gap therebetween, the gate electrode element laterally-extending between opposing anchored ends, the gate electrode element being arranged to deform away from the field emission surface in response to heat, so as to increase the gap between the field emission surface and the gate electrode element.

2. The device of claim 1, wherein the gate electrode element defines opposed first and second laterally-extending surfaces, with the first laterally-extending surface being disposed to face the field emission surface of the cathode element, and wherein the first laterally-extending surface between the opposing ends is planar or concave.

3. The device of claim 2, wherein the second laterally-extending surface is opposed to the first laterally-extending surface so as to face away from the field emission surface, and wherein the second laterally-extending surface between the opposing ends is convex or includes a series of convex protrusions.

4. The device of claim 2, wherein the gate electrode element defines a thickness between the opposed first and second laterally-extending surfaces, the thickness being greater about a medial portion thereof than toward the opposed ends.

5. The device of claim 1, wherein the gate electrode element is arranged to expand laterally in response to heat generated by bombardment of electrons emitted from the field emission surface in response to an electric field between the gate electrode element and the field emission surface of the cathode element.

6. The device of claim 5, wherein the gate electrode element is arranged such that deformation thereof in response to the lateral expansion increases the gap between the gate electrode element and the field emission surface of the cathode element, and decreases the bombardment of electrons on the gate electrode element, the decreased electron bombardment reducing the generated heat, and causing the gate electrode element to laterally contract to reverse the deformation thereof.

7. The device of claim 1, wherein gate electrode element is comprised of a conductive material having a high melting temperature.

8. The device of claim 1, wherein the gate electrode element is comprised of tungsten, molybdenum, stainless steel, doped silicon, or combinations thereof.

9. A method of forming a field emission cathode device, comprising:

arranging a gate electrode element in spaced-apart relation to the field emission surface of the cathode element so as to define a gap therebetween; and anchoring opposing ends of the gate electrode element such that the gate electrode element extends laterally therebetween, and such that the gate electrode element is arranged to deform away from the field emission surface in response to heat, so as to increase the gap between the field emission surface and the gate electrode element.

10. The method of claim 9, wherein the gate electrode element defines opposed first and second laterally-extending surfaces, with the first laterally-extending surface being disposed to face the field emission surface of the cathode element, and wherein the method comprises forming the gate electrode element such that the first laterally-extending surface between the opposing ends is planar or concave.

11. The method of claim 10, wherein the second laterally-extending surface is opposed to the first laterally-extending surface so as to face away from the field emission surface, and wherein the method comprises forming the gate electrode element such that the second laterally-extending surface between the opposing ends is convex or includes a series of convex protrusions.

12. The method of claim 10, wherein the gate electrode element defines a thickness between the opposed first and second laterally-extending surfaces, and wherein the method comprises forming the gate electrode element such that the thickness is greater about a medial portion thereof than toward the opposed ends.

13. The method of claim 9, wherein the gate electrode element is arranged to expand laterally in response to heat, and wherein anchoring the opposed ends comprises anchoring the opposed ends of the gate electrode element such that the gate electrode element is heated by bombardment of electrons emitted from the field emission surface in response to an electric field between the gate electrode element and the field emission surface of the cathode element.

14. The method of claim 13, wherein anchoring the opposed ends comprises anchoring the opposed ends of the gate electrode element such that deformation thereof in response to the lateral expansion increases the gap between the gate electrode element and the field emission surface of the cathode element, and decreases the bombardment of electrons on the gate electrode element, the decreased electron bombardment reducing the generated heat, and causing the gate electrode element to laterally contract to reverse the deformation thereof.

15. The method of claim 9, comprising forming the gate electrode element from a conductive material having a high melting temperature.

16. The method of claim 9, comprising forming the gate electrode element from tungsten, molybdenum, stainless steel, doped silicon, or combinations thereof.

* * * * *